United States Patent
Rao et al.

(10) Patent No.: US 7,508,966 B2
(45) Date of Patent: Mar. 24, 2009

(54) OPTICAL FOURIER SYSTEMS AND METHODS FOR MEDICAL IMAGE PROCESSING

(75) Inventors: D. V. Gopal L. N. Rao, Lexington, MA (US); Pengfei Wu, Malden, MA (US)

(73) Assignee: University of Massachusetts, Boston, MA (US)

( * ) Notice: Subject to any disclaimer, the term of this patent is extended or adjusted under 35 U.S.C. 154(b) by 666 days.

(21) Appl. No.: 10/684,139

(22) Filed: Oct. 10, 2003

(65) Prior Publication Data

US 2004/0136577 A1 Jul. 15, 2004

Related U.S. Application Data

(60) Provisional application No. 60/418,065, filed on Oct. 11, 2002.

(51) Int. Cl.
*G06K 9/00* (2006.01)
(52) U.S. Cl. ............... 382/128; 382/280; 382/210
(58) Field of Classification Search ......... 382/128–133, 382/276, 131; 359/559, 298; 378/168; 600/473; 250/201.1, 358
See application file for complete search history.

(56) References Cited

U.S. PATENT DOCUMENTS

| | | | | |
|---|---|---|---|---|
| 3,700,902 A | * | 10/1972 | Buchan | 250/201.1 |
| 3,821,794 A | * | 6/1974 | Yoneyama | 348/104 |
| 3,947,123 A | * | 3/1976 | Carlson et al. | 356/39 |
| 4,150,360 A | * | 4/1979 | Kopp et al. | 382/133 |
| 4,447,141 A | * | 5/1984 | Eisenkraft | 351/237 |

(Continued)

FOREIGN PATENT DOCUMENTS

DE 159217 2/1983

(Continued)

OTHER PUBLICATIONS

Panchangam, A. et al, "Processing of medical images using real-time optical Fourier processing," Med Phys, 28 (1) Jan. 2001, pp. 22-27.

*Primary Examiner*—Jingge Wu
*Assistant Examiner*—Jayesh A Patel
(74) *Attorney, Agent, or Firm*—Wilmer Cutler Pickering Hale and Dorr LLP (57) ABSTRACT

A preferred embodiment optical system for processing a medical image includes an input image, a light source emitting a light beam which is directed at the input image, a first Fourier optical transformer receiving and focusing the light beam, and at least one spatial filter disposed at a focal plane of the Fourier lens to generate a filter Fourier spectrum. The system further includes a second optical Fourier transformer receiving the filtered Fourier spectrum and generating an inverse Fourier transform that results in a processed image. The system includes an image sensor to detect the processed image and generate an electronic representation of the processed image. In an embodiment, the input image is a two-dimensional image generated by a medical imaging method such as, for example, a mammogram or an image of a Pap smear. The input image can be generated by at least one of an x-ray, magnetic resonance, computerized axial tomography and ultrasound imaging method. The light source can be a laser, such as a diode pumped laser emitting light radiation having a wavelength in the range of 300 to 800 nm.

34 Claims, 9 Drawing Sheets

U.S. PATENT DOCUMENTS

| | | | | |
|---|---|---|---|---|
| 4,625,325 | A | * | 11/1986 | Beraudo ........................ 378/168 |
| 4,695,973 | A | * | 9/1987 | Yu .............................. 708/816 |
| 5,710,429 | A | * | 1/1998 | Alfano et al. ............. 250/358.1 |
| 5,760,894 | A | | 6/1998 | Mersch ........................ 356/246 |
| 5,777,736 | A | | 7/1998 | Horton ........................ 356/346 |
| 5,799,656 | A | * | 9/1998 | Alfano et al. ................ 600/473 |
| 5,854,710 | A | * | 12/1998 | Rao et al. .................... 359/559 |
| 6,101,034 | A | * | 8/2000 | Cox et al. .................... 359/562 |
| 6,246,782 | B1 | * | 6/2001 | Shapiro et al. ............... 382/128 |
| 6,421,454 | B1 | * | 7/2002 | Burke et al. ................. 382/131 |
| 6,909,792 | B1 | * | 6/2005 | Carrott et al. ................ 382/128 |
| 2002/0044279 | A1 | | 4/2002 | Khoury ....................... 356/300 |
| 2002/0067535 | A1 | * | 6/2002 | Trezza ........................ 359/298 |

FOREIGN PATENT DOCUMENTS

| | | |
|---|---|---|
| DE | 213072 | 8/1984 |
| DE | 283306 | 10/1990 |
| JP | 2000011178 | 1/2000 |
| WO | WO 00/50859 | 2/2000 |
| WO | WO 01/07879 | 7/2000 |

* cited by examiner

Original image
Figure 4A

Processed by filter 62
Figure 4B

Processed by filter 64
Figure 4C

Processed by filter 66
Figure 4D

Processed by filter 68
Figure 4E

Figure 5C
Processed by filter 68

Figure 5B
Processed by filter 66

Figure 5A
Original image

Processed by filter 66
Figure 6B

Original image
Figure 6A

OPTICAL FOURIER SYSTEMS AND METHODS FOR MEDICAL IMAGE PROCESSING

CROSS REFERENCES TO RELATED APPLICATIONS

The present application claims the benefit of U.S. Provisional Application No. 60/418,065, filed Oct. 11, 2002. The entire contents of the above applications are incorporated herein by reference in its entirety.

GOVERNMENT SUPPORT

This invention was supported, in whole or in part, by a grant from the National Cancer Institute, National Institute of Health, Grant No. 1R21CA89673-01A1. The Government has certain rights in the invention.

BACKGROUND OF THE INVENTION

The incidence of cancer, in particular breast cancer and cervical cancer, is still high according to the statistical data in the United States. Early detection of the cancer is extremely important for successful treatment. However, it is not easy for the radiologists to quickly and accurately diagnose the pathological changes by using the original medical images such as, for example, mammograms and Pap smears, in which the abnormal changes are buried in surrounding tissue. Therefore, it is important to explore techniques to enhance desired components and filter out undesired components present in the medical images so that the radiologist and/or pathologist and other medical personnel can easily make a diagnosis and prescribe appropriate treatment.

Medical image processing with digital techniques is being increasingly used for such applications. It has been demonstrated that medical image processing is very helpful for the diagnosis. However, digital image processing is a manipulating-in-series method and is aided by computers and expensive electronic equipment. Often related software is complicated and time consuming for medical personnel to manipulate. Moreover, the digital methods also require many accessories for image sampling, transformations, processing, and output displays and results.

There still remains a need for simple and cost-effective systems that assist in medical image processing.

SUMMARY OF THE INVENTION

The preferred embodiments of the present invention are directed to cost effective optical systems for image processing, in particular processing of medical images, using optical Fourier systems and methods. Embodiments of the present invention include an optical Fourier system having real-time optical processors with spatial filters to generate a filtered image from an x-ray film, for example. A preferred embodiment can include a self-adaptive optical processor with non-linear optical films of the biomaterial Bacteriorhodopsin. The desired components present in medical images, for example, mammograms and Pap smear images, which are not clearly visible to the naked eye in original images are identifiable in the processed images. The image processing facilitates detection of lesions or microcalcifications located in dense tissue in the case of mammograms, and abnormal cells in Pap smears. The results are helpful for early diagnosis of cancers, for example, breast and cervical cancers. The systems of the preferred embodiments include a low-cost, durable, portable battery operated system for rapid screening of mammograms and Pap smears.

A preferred embodiment optical system for processing a medical image includes an input image, a light source emitting a light beam which is directed at the input image, a first Fourier optical transformer receiving and focusing the light beam, and at least one spatial filter disposed at a Fourier plane which is located at the focus of the Fourier lens to generate a filtered Fourier spectrum. The system further includes a second optical Fourier transformer receiving the filtered Fourier spectrum and generating an inverse Fourier transform that results in a processed image. The system includes an image sensor to detect the processed image and generate an electronic representation of the processed image. In an embodiment, the input image is a two-dimensional image generated by a medical imaging method such as, for example, a mammogram or an image of a Pap smear that is located on a transmissive or reflective medium. The input image can be generated by at least one of an x-ray, magnetic resonance, computerized axial tomography and ultrasound imaging method. The light source can be a laser, such as a diode pumped laser emitting light radiation having a wavelength in the range of 300 to 800 mm or a lamp.

In the optical Fourier system of the preferred embodiment, the first and second optical Fourier transformers are lenses. The image sensor of the optical Fourier system comprises a charge coupled device (CCD), a CMOS imaging device or other solid state pixellated imager in preferred embodiments. The optical Fourier system further includes a controller that is electronically connected to the image sensor, wherein the controller actuates the readout of the electronic representation from the image sensor. The system further includes a processor, for example, a computer, electrically coupled to the controller, an image storage device and a display device.

In accordance with another aspect of the present invention, a method of processing an image using an optical Fourier system includes irradiating an input image with an input beam, focusing the input beam onto a Fourier plane and generating a Fourier spectrum using a first optical Fourier transformer. The Fourier spectrum is then filtered by applying at least one spatial filter to generate a filtered Fourier spectrum. A processed image is generated by using an inverse Fourier transformer, and the method includes detecting the processed image using an image sensor.

In accordance with another aspect of the present invention, a preferred embodiment of the optical Fourier system is manufactured as a portable device having a weight in the range of approximately two to five pounds depending upon the light source used and a volume less than 5000 $cm^3$, or in the range of approximately 30.5 cm×5 cm×5 cm to 50.8 cm×10 cm×10 cm.

The foregoing and other features and advantages of the optical Fourier systems and methods for medical image processing will be apparent from the following more particular description of preferred embodiments of the system and method as illustrated in the accompanying drawings in which like reference characters refer to the same parts throughout the different views.

The drawings are not necessarily to scale, emphasis instead being placed upon illustrating the principles of the invention.

DETAILED DESCRIPTION OF THE INVENTION

Optical Fourier methods in accordance with the present invention are well suited for medical image processing. The optical Fourier transform is a powerful tool used in optical computing and processing systems. Preferred embodiments include parallel processing ability that approximates the speed of light and is well suited for medical image processing applications. With low-cost components like lenses, filters, mirrors and diode lasers, portable systems for image processing can be fabricated in accordance with preferred embodiments of the present invention.

Preferred embodiments of the present invention included analyzing several medical images including, for example, mammograms and Pap smears using optical processors coupled to real-time optical systems having various filters. One embodiment includes a self-adaptive optical system having nonlinear optical films of the biomaterial Bacteriorhodopsin (BR). The regions of abnormal pathological changes which are unclear or invisible in the original images are identified in the processed images that result from the preferred embodiments. The results are very useful for the radiologists, and pathologists for diagnosis as well as successful treatment.

The propagation of light in free space can be described conveniently by Fourier analysis. The complex amplitude of a monochromatic wave can be expanded as a superposition of harmonic components of different spatial frequencies. Each harmonic component corresponds to a plane wave and the plane wave traveling at different angles corresponds to different spatial frequencies. Since the spatial frequency reflects the information carried by light, the principle suggests that light can be used to compute and process the input information if one can separate these waves. An optical lens can transform a plane wave into a paraboloidal wave focused to a point at the focal plane of the lens. Different waves with different spatial frequencies can be mapped to various points in the focal plane and thus the lens can separate the contributions of the different frequency plane waves. This relatively simple method allows one to easily separate and process the light waves at the focal plane, i.e., Fourier transform by a lens and processing with various spatial filters. In order to enhance the pathological changes in the medical images, one needs to determine and locate their frequency region in the focal plane of the Fourier transform and then pass only the useful frequency components. Through an inverse Fourier transform with another Fourier lens, the processed frequencies can be reconstructed as image information, in which the undesired components in medical images are filtered out, displaying only the desired components.

Figure 1:
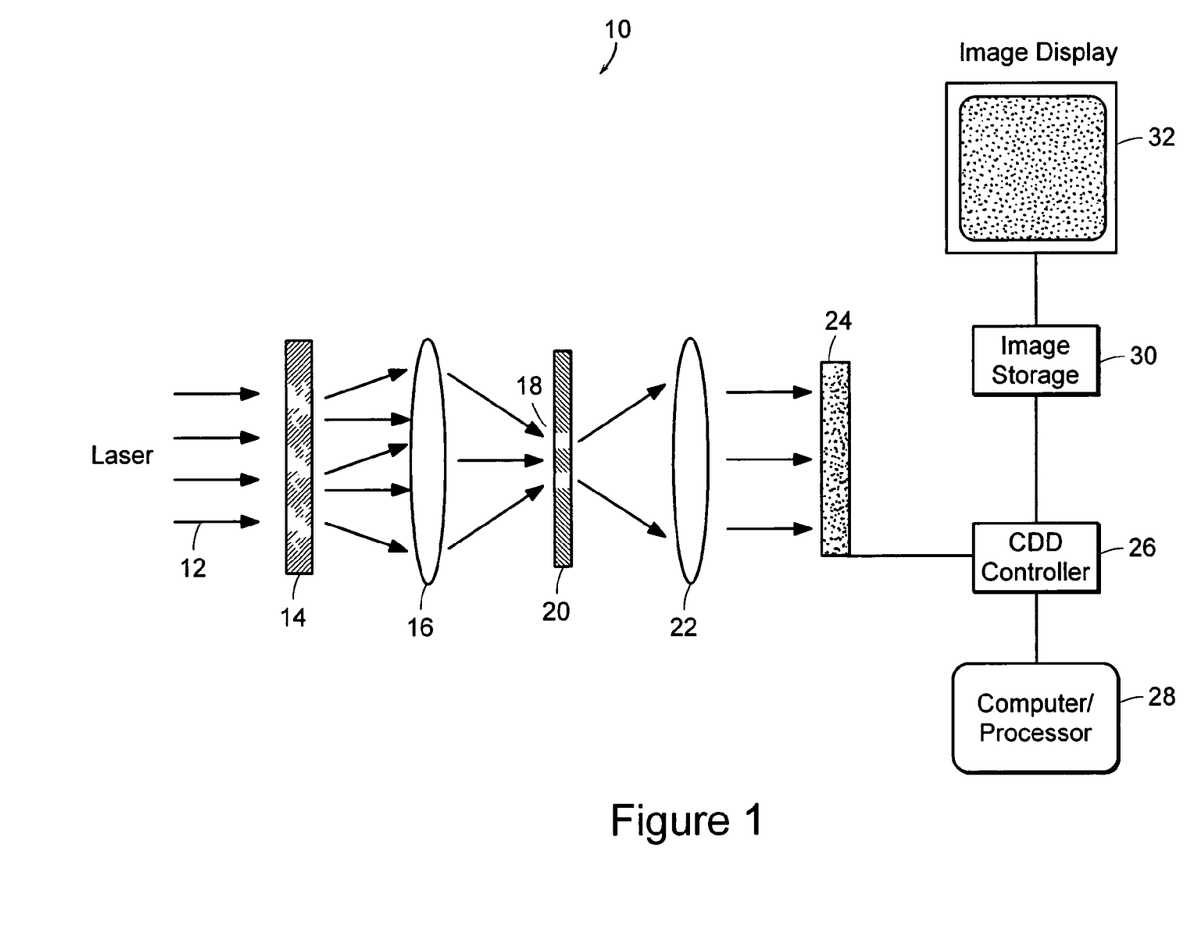
FIG. 1 is a diagram illustrating the principles of an optical Fourier system for medical image processing in accordance with a preferred embodiment of the present invention.

FIG. 1 is a schematic diagram illustrating an optical Fourier system 10 for medical image processing in accordance with a preferred embodiment of the present invention. Light from a light source 12 is incident on a two-dimensional image 14, such as, for example, an x-ray film. The light source illuminates the input image with a uniform intensity of approximately 1.5 milliwatt/cm$^2$. The power of the light source is approximately 20 milliwatts. The size of the input image film is approximately 2.54 cm×2.54 cm. The light beam propagates through the two-dimensional input image and is transmitted to a Fourier lens 16. The light is spatially transformed to result in a Fourier spectrum 18 as the light waves are separated at the focal plane of the lens 16. Spatial filters 20 are then used to selectively filter low or high spatial frequencies to result in a filtered spectrum. The filters are located at the focus of the Fourier lens. A lens 22, for example, a second Fourier lens provides for an inverse Fourier spectrum of the filtered spectrum. The processed frequencies can now be reconstructed as image information displaying the desired components of the image. A post processor and display subsystem can analyze and/or display the processed image.

In a preferred embodiment, the processed image is optically coupled to a detector, for example, a charge coupled device (CCD) or CMOS imaged device 24. The CCD can be, for example, a two-dimensional array of detectors integrated into a single compact electronic chip. The CCD sensor 24 converts photons to electrons using closely spaced metal-oxide-semiconductor (MOS) diodes and thereby generates a discrete electronic representation of a received optical image. The discrete representation in the CCD is read out by a controller 26. The controller 26 reads the image representation from the CCD sensor pixel by pixel and organizes it into a digital array. The digital array can then be output to a memory or image store 30. From the image store 30, the image can be accessed by a data processor 28 for performing any post-processing. A cathode ray tube (CRT) 32 or other type of electronic, image display is provided to allow the image to be displayed before or after processing by the data processor 28.

Figure 2:
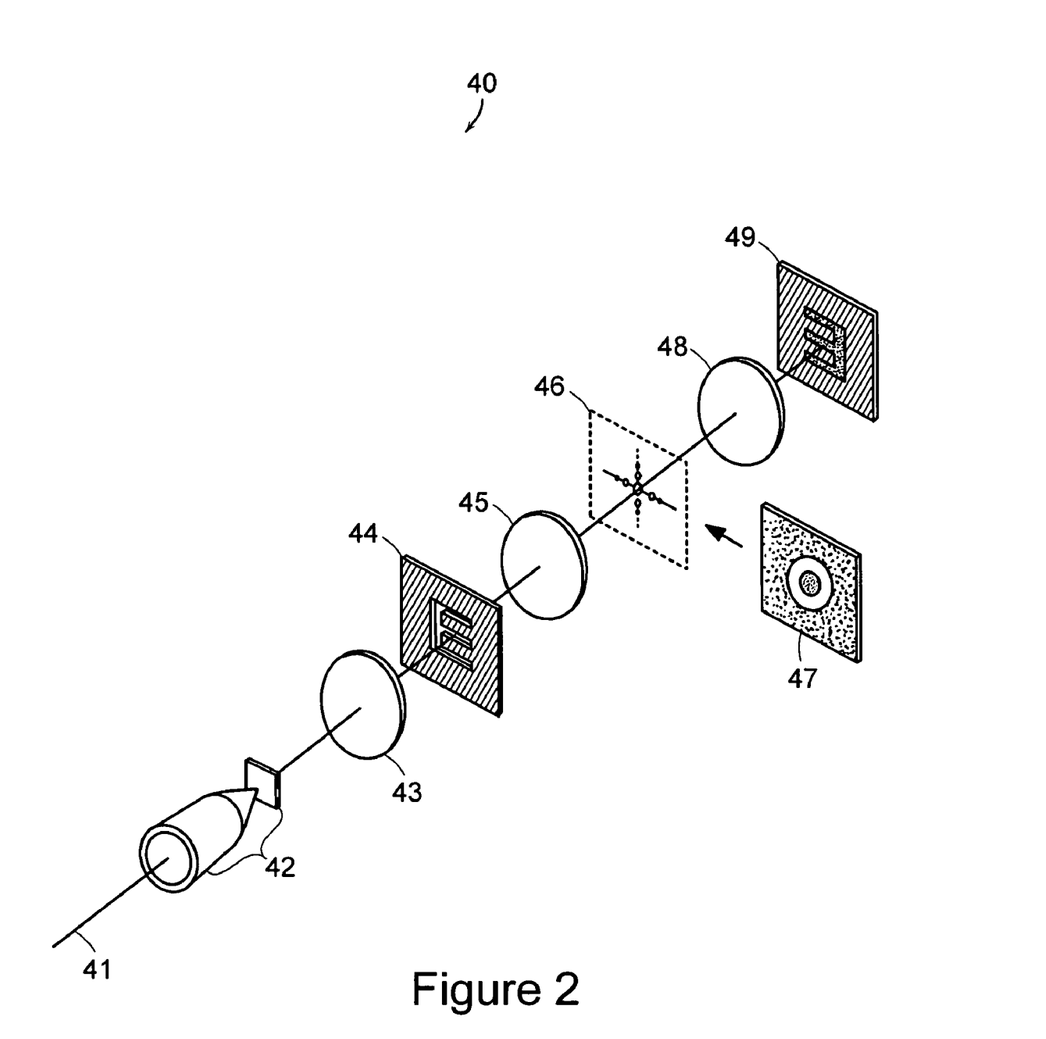
FIG. 2 illustrates a schematic diagram of an optical Fourier system for image processing in accordance with a preferred embodiment of the present invention.

FIG. 2 illustrates a schematic diagram of the optical Fourier system in accordance with a preferred embodiment of the present invention. A small diode pumped laser with a 532 nm output is used as a light source. The light source can be any laser emitting a wavelength in the range of approximately 300-800 nm. The laser light beam 41 is expanded to a spatial uniform beam by using a microlens and pin hole filter 42, and is then collimated by a lens 43. The optical elements, for example, the lens and polarizers can be supplied by, for example, Newport Corporation of Irvine, Calif. and Edmund Industrial Optics of Barrington, N.J. After illuminating the entire input image 44, the laser beam is focused by a lens 45 (Fourier lens). At the Fourier plane 46, various spatial filters 47 are applied for image processing. These spatial filters can include glass slides that have been selectively masked. Through an inverse Fourier process by using a reverse Fourier lens 48, the processed frequency components in the Fourier plane are converted back to image format 49 which is detected by using, for example, a CCD detector. Thus, both binary images, for example, the letter E, and medical images are analyzed by using optical Fourier processor methods in accordance with a preferred embodiment of the present invention with several spatial filters.

Figure 3:
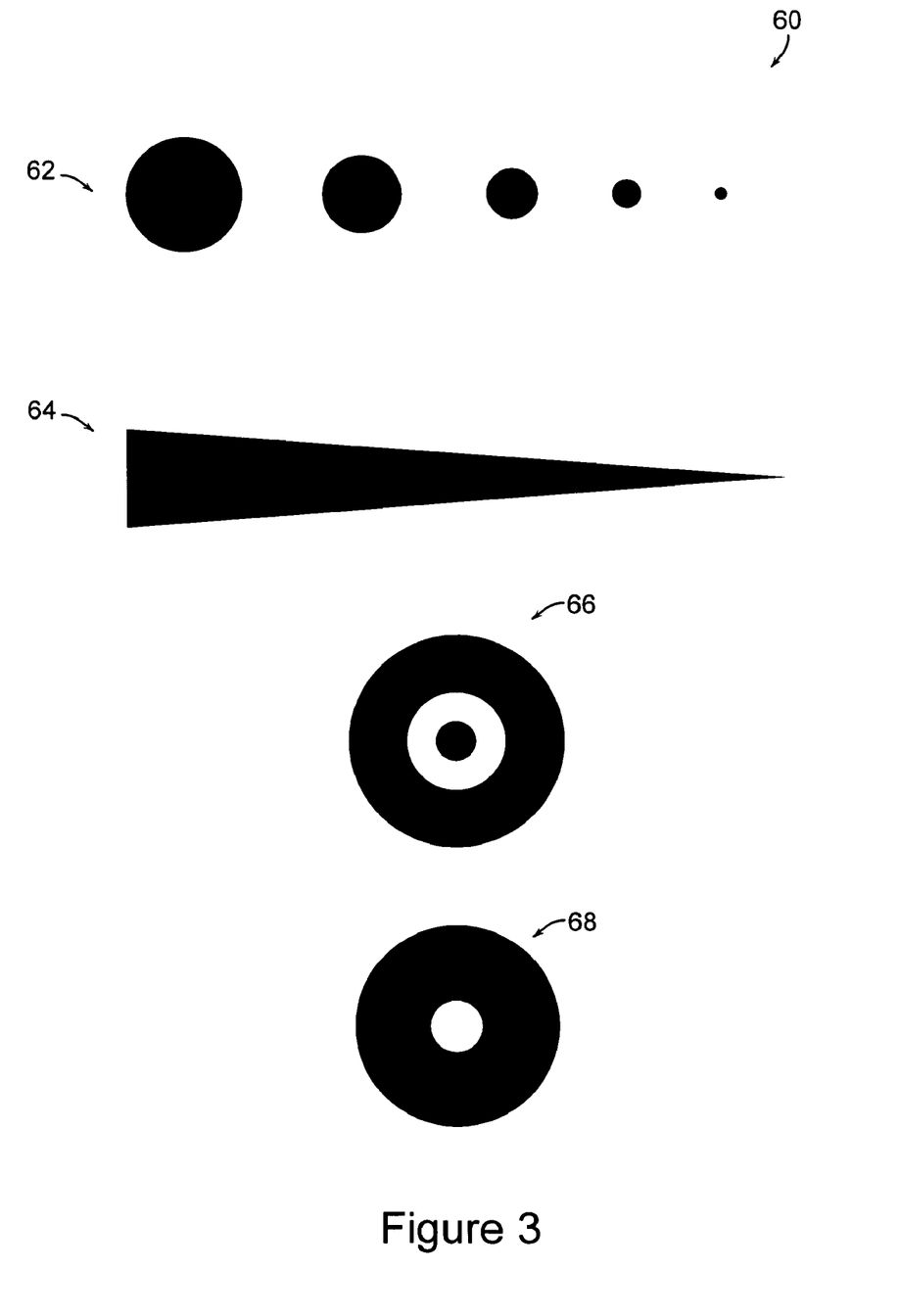
FIG. 3 illustrates a plurality of filters used in an optical Fourier system in accordance with a preferred embodiment of the present invention.

Different frequency components in the images can be spatially separated at the Fourier plane. FIG. 3 illustrates several filters fabricated in accordance with a preferred embodiment of the present invention in order to select desired frequency bands for medical image processing. Filters 62 and 64 can be shifted from left to right for increasing the area to block low frequencies wherein the area blocking the light is changed discontinuously in filter 62 and continuously in filter 64. The filters 66 and 68 can change a transparent region, the white region in the filters, continuously and radially by enlarging or reducing the sizes of circles. The desired components of the images can be enhanced by using suitable filters and adjusting the filters to block undesirable frequency bands.

Figure 4A:
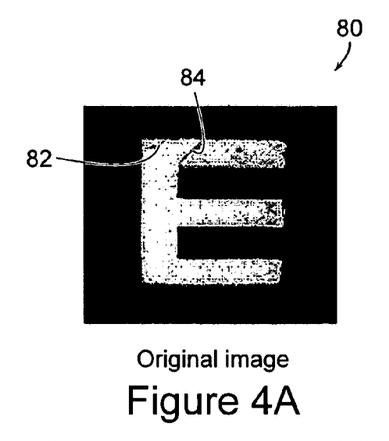
FIGS. 4A-4E illustrate original binary image and the results of the image processing using different filters shown in FIG. 3 in accordance with a preferred embodiment of the present invention.
Figure 4B:
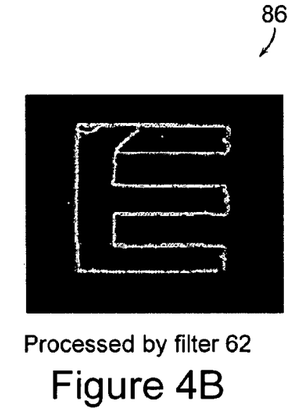
Figure 4C:
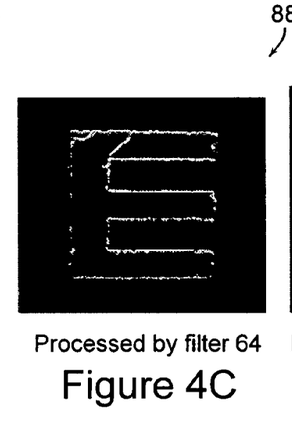
Figure 4D:
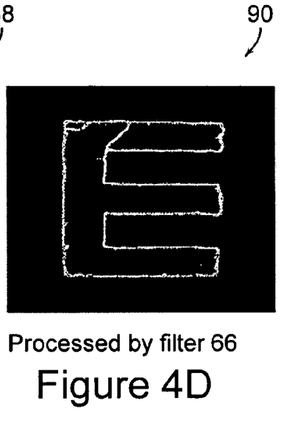
Figure 4E:
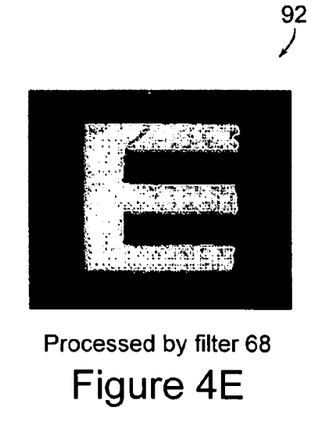

FIGS. 4A-4E illustrate the original binary image and the results of the image processing with different filters in accordance with a preferred embodiment of the present invention. By using the filters 62, 64 and 66, shown in FIG. 3, image edge enhancements are obtained as the filters function to block the low frequency components. In the original image two very thin filaments 82, 84 were placed by design in the top left corner of the original image 80. The filaments, indicated by arrows 82, 84, are not very clear in the original image, but can be clearly seen in the processed images with the filters 62, 64, and 66 (FIGS. 4B-4D, respectively). The resultant image, FIG. 4D, with filter 66 is better than those obtained with the other two filters 62, 64. The image (FIG. 4B) processed by the filter 62 has blurry edges and the image (FIG. 4C) processed by the filter 64 shows weak enhancements in vertical edges, but is clear with respect to horizontal edges. The reason is that the filters 62 and 64 only block low frequency bands, the filter 64 blocks more components in horizontal direction. However, the filter 66 enables to scan different frequency regions by expanding or contracting the annular ring and selecting an appropriate frequency band to process. On the other hand, the filter 68 (FIG. 4E) blocks all of the high frequency components but passes low frequency components, and thus the processed image (FIG. 4E) becomes soft with no sharp edges. Thus, the filaments 82, 84 become more blurry as they correspond to the high frequencies. The results demonstrate that the system in accordance with a preferred embodiment of the present invention can be used to enhance some useful components and block undesirable components in the images.

Figure 5A:
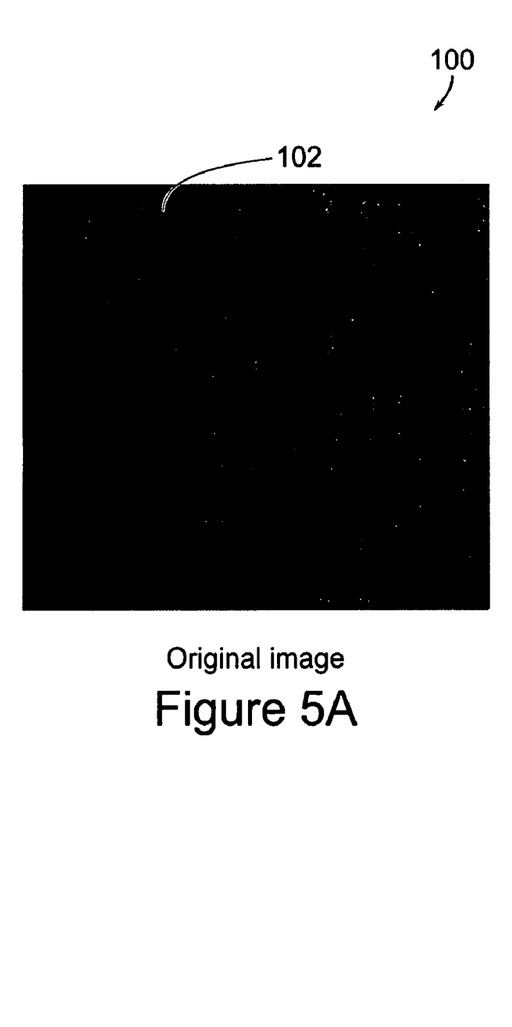
FIGS. 5A-5C illustrate an original medical image (mammogram) and the processed images, respectively, using two different filters in accordance with a preferred embodiment of the present invention.
Figure 5B:
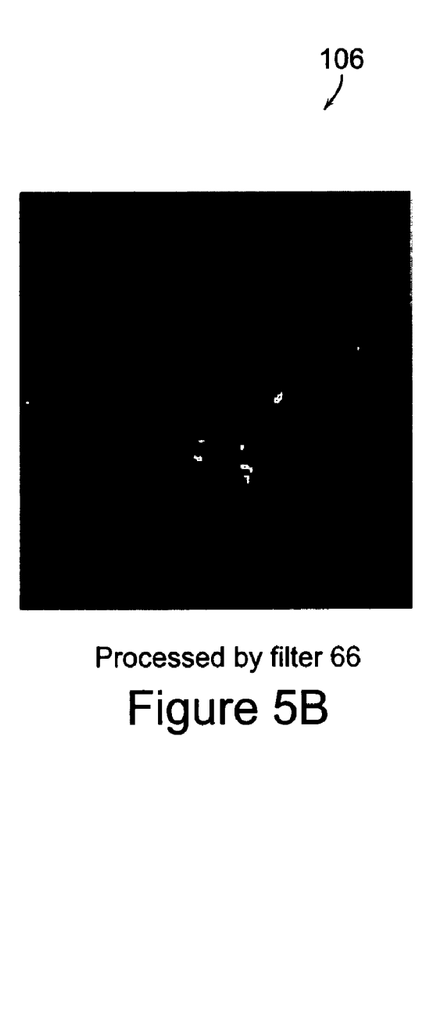
Figure 5C:
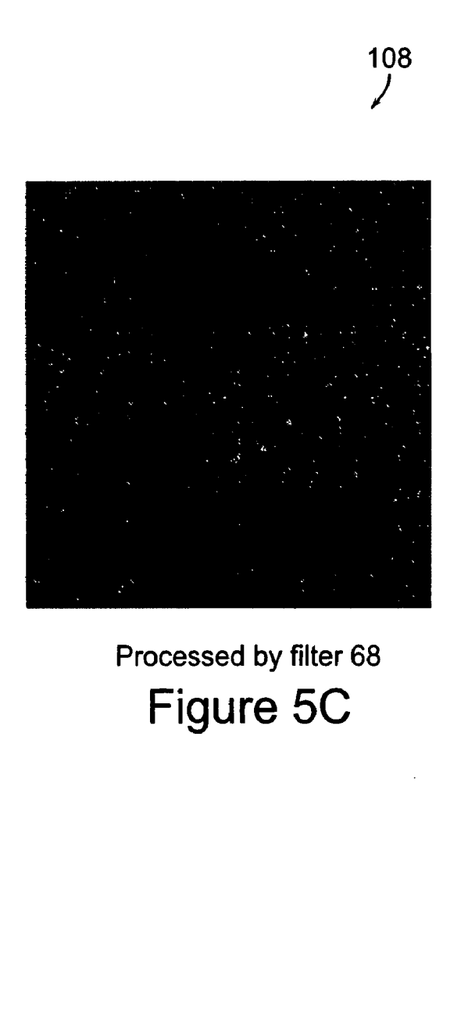

FIGS. 5A-5C illustrate the original medical images (mammograms) and the results of a mammogram processed by using filters 66 and 68 shown in FIG. 3. The region of abnormal pathological changes is pointed by an arrow 102 in the original image (FIG. 5A). Mammography is a specific type of imaging that uses a low-dose x-ray system and high-contrast, high-resolution film for examination of the breasts. Most medical experts agree that successful treatment of breast cancer often is linked to early diagnosis. Mammography plays a central part in early detection of breast cancers because it can show changes in the breast up to two years before a patient or physician can feel them. A radiologist, who is a physician experienced in mammography and other x-ray examinations, analyzes the images, describes any abnormalities, and suggests a likely diagnosis. The system in accordance with a preferred embodiment of the present invention is useful for the radiologist as they identify the presence of any abnormalities.

The image shown in FIG. 5B is the processed image with the filter 66, in which the abnormal pathological changes (microcalcifications) are identified since they correspond to higher frequency bands as compared to the surrounding tissue. The image shown in FIG. 5C is processed by the low pass filter 68 and shows mostly the surrounding tissue corresponding to low spatial frequencies.

Figure 6A:
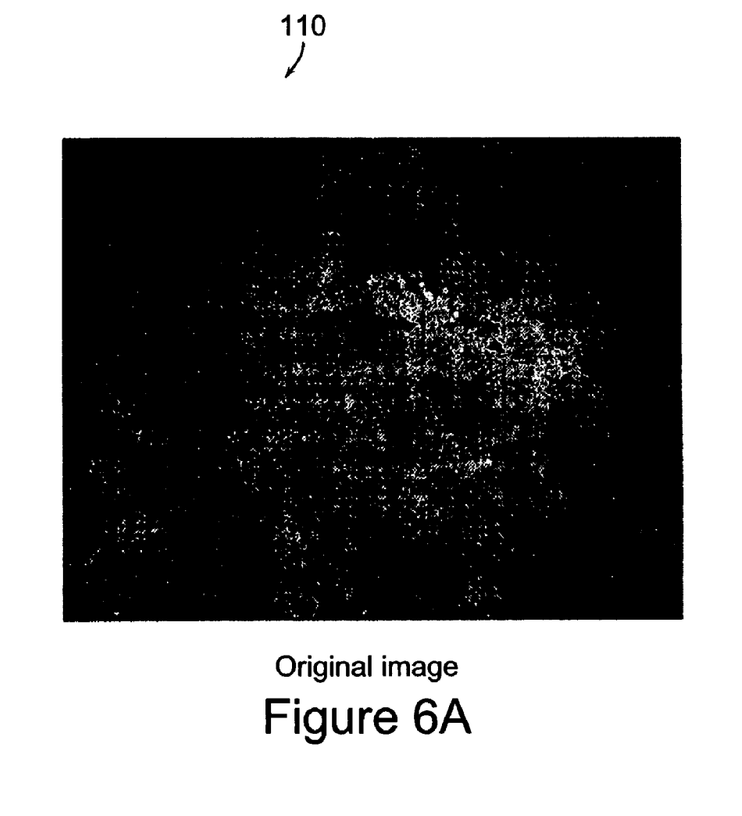
FIGS. 6A and 6B illustrate another original mammography image and the results of image processing, respectively, in accordance with a preferred embodiment of the present invention.
Figure 6B:
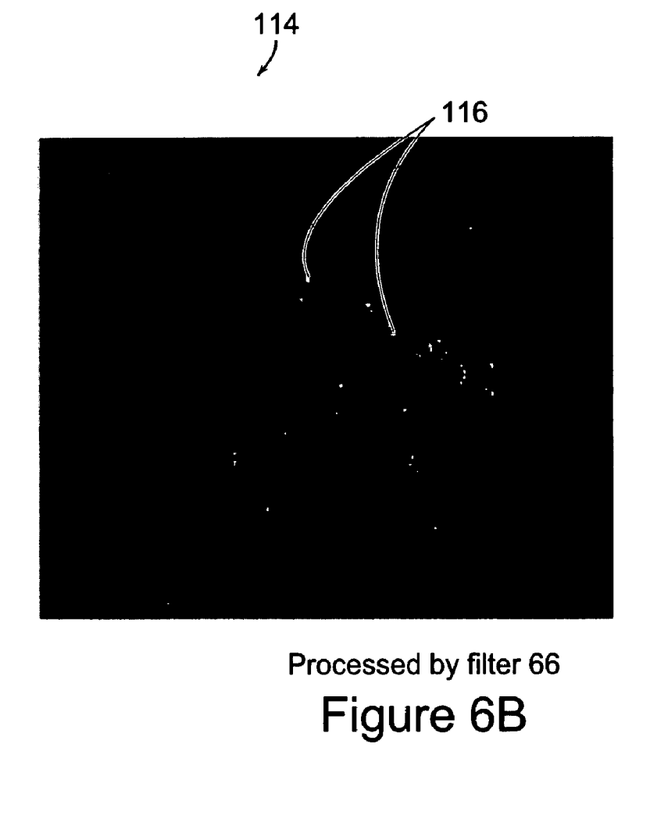

FIGS. 6A and 6B illustrate the original mammography image and the results of image processing with a second mammogram, respectively. The regions with microcalcifications 116 which are invisible in the original image have been clearly identified in the processed image (FIG. 6B).

In accordance with another aspect of the present invention, the medical image can be processed by using nonlinear optical processors with photo-induced anisotropic materials such as biological bacteriorhodopsin (BR) films and organic azobenzene films. The optical materials functionalized with BR and azobenzene compounds have shown great promise as candidates for the applications in photonic technology because of their high inherent optical nonlinearities which originate from molecular structure and absorption changes upon light irradiation. Many studies have been reported on these materials in the field of optical nonlinearities and their applications, such as wave mixing, holographic storage, real-time spatial light modulator and image information processing.

Figure 7:
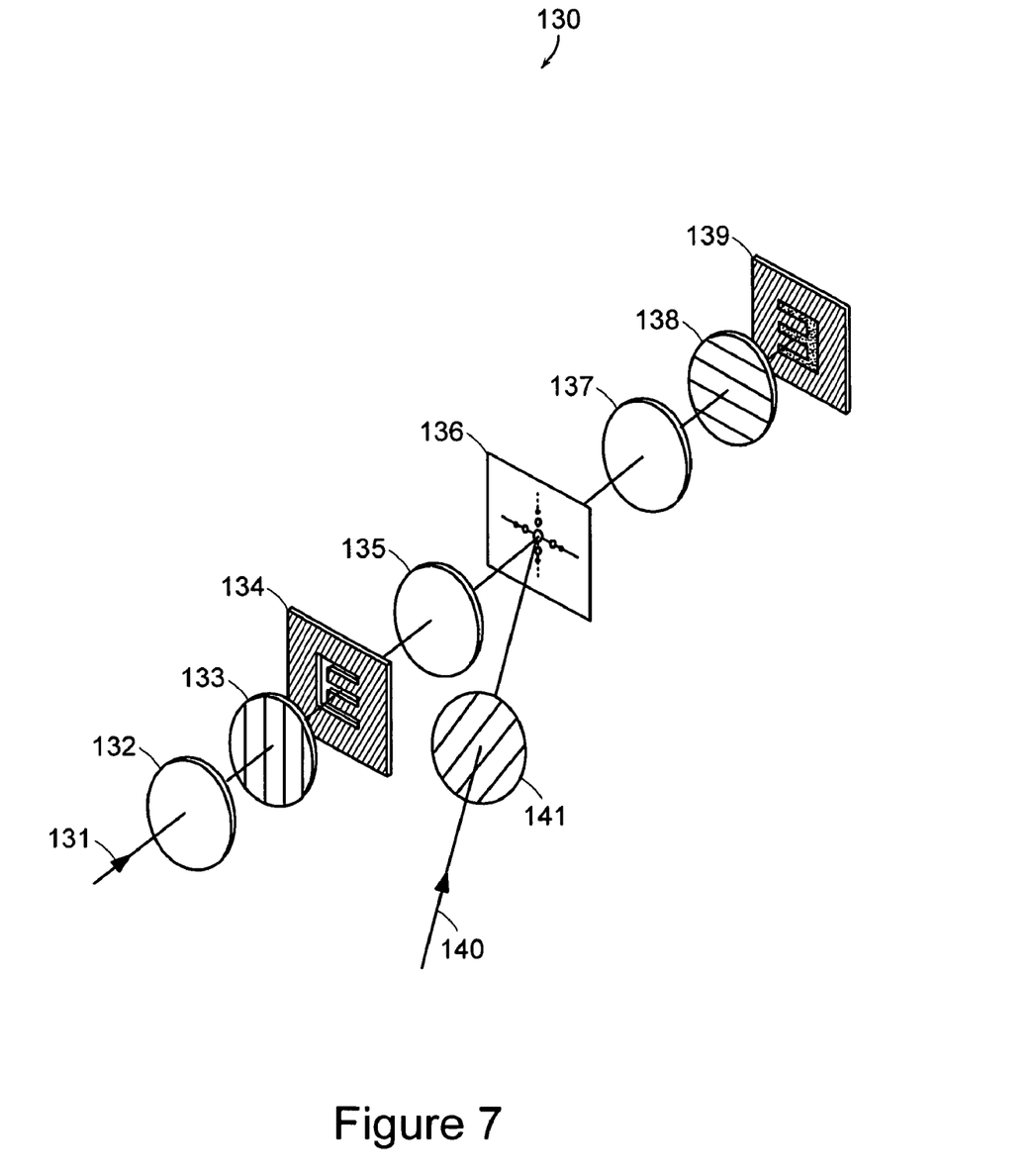
FIG. 7 illustrates a schematic diagram of an image processing system using non-linear dichromatic films instead of filters in accordance with a preferred embodiment of the present invention

The BR and azobenzene materials possess large photo-induced anisotropic effects under illumination of linearly-polarized light. The photo-induced anisotropy enables to control the polarization states of incoming probe beam, and thus it can be used to process or compute the information carried by the light beams. The photo-induced dichromatic property of the BR films can be used to achieve a real-time, self adaptive spatial filtering system in medical image processing in accordance with a preferred embodiment of the present invention. FIG. 7 illustrates a schematic diagram of such an image processing system using non-linear dichromatic films such as, for example, BR films in accordance with a preferred embodiment of the present invention. Systems and methods for optical Fourier processing based on photochromic materials is described in U.S. Pat. No. 5,854,710, to Rao et al, the entire teachings of which are incorporated herein by reference. Similar to the system shown in FIG. 2, an expanded and uniform beam from a light source, such as, for example, a diode pump laser emitting a light beam with a 532 nm wavelength is incident on a collimating lens 132. A vertical polarizer 133 and a horizontal analyzer 138 are applied to the system (in front of input image 134 and output image 139, respectively). The filter in FIG. 2 is replaced by the nonlinear optical BR film 136 in the Fourier transform plane. The BR film 136 is also irradiated by an actinic beam 140 which is linearly polarized at 45° from the vertical direction by a 45° polarizer 141. This optical system is real-time and self-adaptive.

In this embodiment, the photo-induced (dichromatism) anisotropy of the BR film depends on the intensity of polarized actinic beam. The resulting polarization rotation of a linear-polarized probe beam is also intensity-dependent. It is observed that the rotation of the probe polarization reached a maximum angle for an optimum actinic beam intensity of about 10 mW/cm² and decreased with further increase of the actinic beam intensity. Since the actinic beam is Gaussian with a higher intensity distribution in the beam center than in the beam edge, the resulting photo-induced anisotropy (photo-induced dichromatism is dominant for the BR film) is spatially different in the BR film. When a probe beam carrying the medical image information is transformed to the BR film through the Fourier lens 135, the polarizations of Fourier frequency components of the medical image information are rotated by different angles according to the spatial intensity distribution of the actinic beam in the film. This is a polarization encoding process in which the different frequency components of the medical image are encoded as different polarization directions. By adjusting the whole intensity of the Gaussian actinic beam, the maximum angle of polarization rotation is shifted radially along with the beam radius to a desired region with the optimum intensity. By using another polarizer (analyzer) and rotating its polarization angle, one can easily scan and select the useful components and filter out undesirable components. As a result, the desired components in the original image are enhanced. The function of this filtering process is similar to that using the filter 66 illustrated in FIG. 3.

Figure 8A:
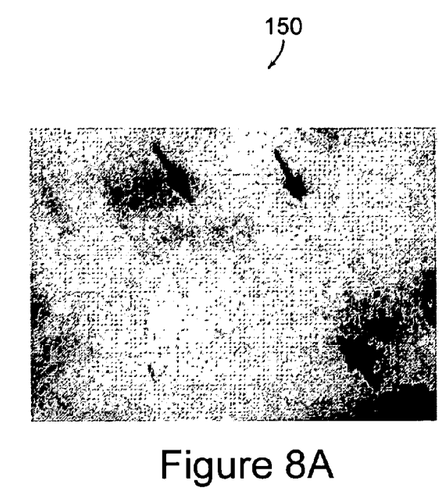
FIGS. 8A and 8B are an original mammogram image and an image processed using an optical Fourier system, respectively, in accordance with a preferred embodiment of the present invention.
Figure 8B:
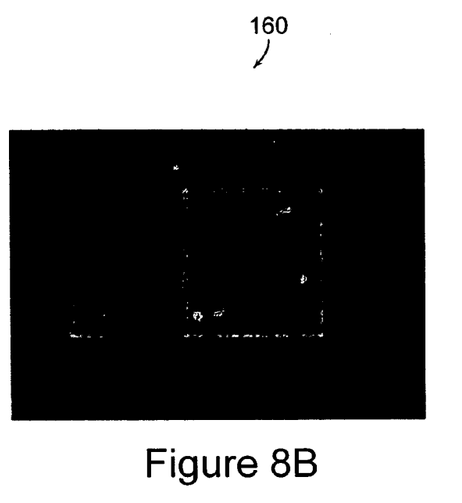

Additional images of a clinical mammogram and a Pap smear are processed with an optical frequency system in accordance with a preferred embodiment of the present invention. FIGS. 8A and 8B illustrate an original mammogram image and an image processed using the system in accordance with a preferred embodiment of the present invention, respectively. As compared to the original mammogram 150, the processed image 160 clearly displays the sites of probable microcalcification clusters.

Figure 9A:
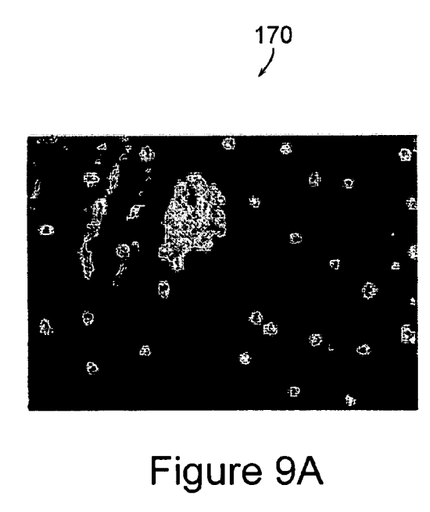
FIGS. 9A and 9B illustrate an original Pap smear image and an image processed using an optical Fourier system, respectively, in accordance with a preferred embodiment of the present invention.
Figure 9B:
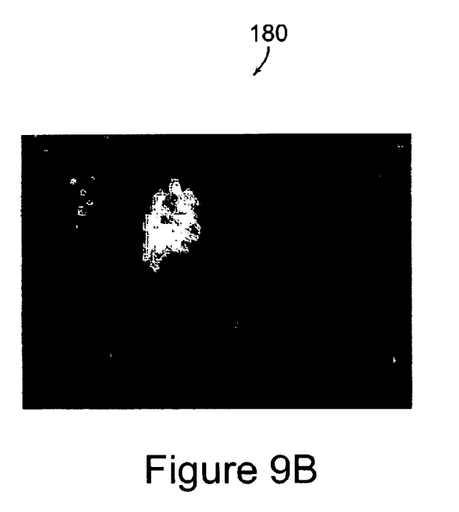

FIGS. 9A and 9B illustrate an original Pap smear image and a processed image using a system in accordance with a preferred embodiment of the present invention. In many cases, the cellular abnormalities related to pathologic entities present in the cervix can be detected and characterized by means of the Pap smear, based on the morphologic alternations of cells created by these entities, and on the presence of inflammatory cells and/or the actual presence of microbiologic agents. The cervical/vaginal Pap smear is an adequately collected cellular sample derived from exfoliated or mechanically dislodged cells of the vagina, cervix, and in some cases, endometrium, which have been smeared on a glass slide, adequately preserved and stained, and evaluated cytomorphologically for one or more of the following purposes, such as, detection of occult pathologic abnormalities of the uterine cervix in asymptomatic women, detection of recurrence of known pathologic abnormalities of the uterine cervix, evaluation of a suspected hormonal abnormality, and monitoring of hormonal therapy. Pap smears are read by cytotechnologists and pathologists. Cytotechnologists are specially trained to identify cell abnormalities. They systematically inspect the entire Pap smear for abnormal cells. Any abnormality is marked for further evaluation by a pathologist. The system in accordance with a preferred embodiment of the present invention assists the pathologist in making a diagnosis. The bright spots in the original image represent the cells. Both normal 172 (small spots) and abnormal cells 174 (large cluster) are visible in the original image. In the processed image, the normal cells are filtered out retaining only the abnormal cells 182. This is achieved by selectively filtering out high spatial frequency components in the Fourier transform.

The methods in accordance with a preferred embodiment of the present invention for medical image processing by using optical Fourier techniques provide image edge enhancement and identification of pathological changes such as, for example, microcalcifications buried in dense tissue. Results obtained with a mammogram and a Pap smear are encouraging, demonstrating the feasibility of a low cost portable instrument for cancer diagnostics. The invisible abnormal regions in the original medical images can be clearly identified using systems in accordance with a preferred embodiment of the present invention. This is important for doctors to make a fast and correct diagnosis. As compared to digital image processing methods, the systems for medical image processing in accordance with a preferred embodiment of the present invention use optical Fourier methods that are cost-effective and fast. A preferred embodiment includes a portable and small-sized device having a weight of approximately five pounds and dimensions of approximately (20 inches×4 inches×4 inches) 50.8 cm×10 cm×10 cm and can be fabricated with ease. The device requires weak light intensity to function.

In an alternate embodiment, having diode lasers such as, for example, supplied by Coherence Incorporated of Santa Clara, Calif. the size of the device is further reduced to about (12 inches×2 inches×2 inches) 30.5 cm×5 cm×5 cm and a weight of approximately two pounds.

Figure 10:
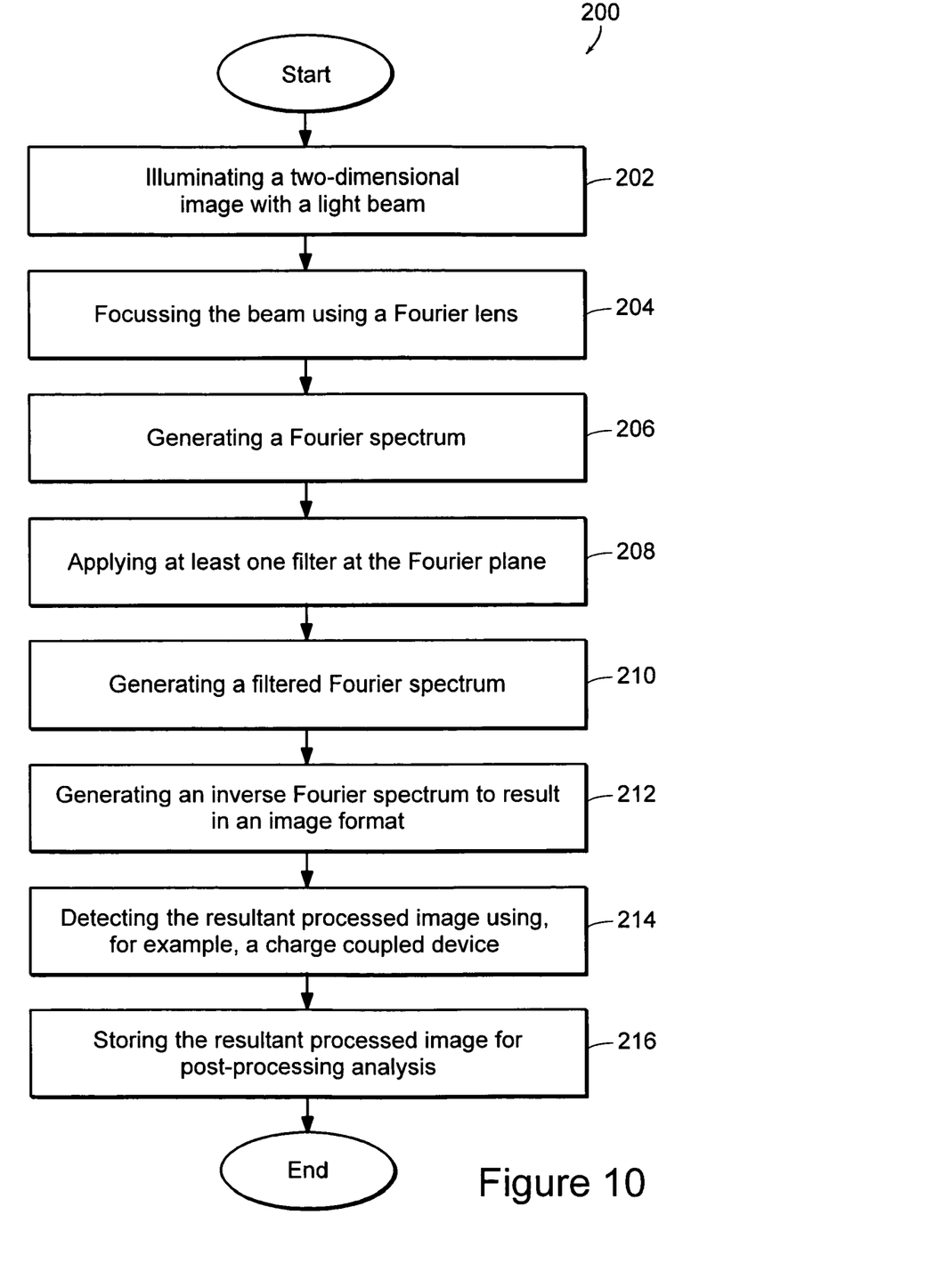
FIG. 10 is a flowchart of a method using optical Fourier systems to process medical images in accordance with a preferred embodiment of the present invention.

FIG. 10 is a flowchart illustrating a method 200 using the optical Fourier system in accordance with a preferred embodiment of the present invention. The method includes the step 202 of illuminating a two-dimensional image with the uniform expanded laser beam. The beam is then focused by a Fourier lens in step 204 to generate a Fourier spectrum per step 204. At the Fourier plane, various filters are applied for image processing to generate a filtered Fourier spectrum per step 210. By using another lens for inverse Fourier processing, the processed frequency components are converted back to image format per step 212 which is detected by using a CCD camera 214. The processed images can be stored in a processor for post-processing analysis per step 216. The regions of abnormal pathological changes, for example, the microcalcifications are identified since they correspond to higher frequency bands as compared to the surrounding tissue. The processed results are very helpful for diagnosis of different cancers, for example, breast cancer and it is possible to fabricate a device which is low-cost and portable. A preferred embodiment of the present invention includes plastic Fourier lens with adequate precision which results in a disposable system.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, other embodiments in hardware or firmware implementations may alternatively be used, and vice-versa.

It will be apparent to those of ordinary skill in the art that methods involved in the system and method for determining and controlling contamination may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed:

1. An optical system for real time processing of an input medical image of bodily tissue, and dynamically identifying abnormal pathological changes in the input medical image, the system comprising:
    a light source emitting light directed at the input medical image of bodily tissue;
    a first optical Fourier element that Fourier transforms light from the input medical image, wherein the Fourier transform occurs in a Fourier plane;
    an adjustable spatial filter in the Fourier plane that filters the transformed light by selectively removing a first frequency component and transmitting a second frequency component, the adjustable spatial filter comprising a transparent annular ring surrounded by opaque regions, wherein the transparent annular ring is expanded or contracted to transmit the second frequency component which is dynamically selected to associate with the abnormal pathological changes in the input medical image;
    a second optical Fourier element that receives the filtered transformed light and inversely Fourier transforms the filtered transformed light to provide a processed medical image of the bodily tissue including the second frequency component; and
    an image sensor that detects the processed medical image and generates an electronic representation of the processed medical image.

2. The optical system of claim 1, wherein the input image comprises a two-dimensional image generated by a medical imaging method.

3. The optical system of claim 2, wherein the input image is a mammogram.

4. The optical system of claim 2, wherein the input image is an image of a Pap smear.

5. The optical system of claim 1, wherein the input image is generated by at least one of an x-ray, magnetic resonance, computerized axial tomography and ultrasound imaging method.

6. The optical system of claim 1, wherein the light source comprises a laser.

7. The optical system of claim 6, wherein the laser comprises a diode pumped laser.

8. The optical system of claim 1, wherein the first and second optical Fourier elements are lenses.

9. The optical system of claim 1, wherein the light source emits in a wavelength range of 300 to 800 nm.

10. The optical system of claim 1, wherein the image sensor comprises a charge coupled device (CCD).

11. The optical system of claim 1, further comprising a controller that is electronically connected to the image sensor, the controller actuating readout of the electronic representation from the image sensor.

12. The system of claim 11, further comprising a processor electrically coupled to the controller, an image storage device and a display device.

13. The optical system of claim 6, wherein the laser emits light having an intensity of 1.5 milliwatt/cm2.

14. The optical system of claim 1, wherein the input image has a size of less than 10 cm2.

15. A method of real time processing of an input medical image of bodily tissue, and dynamically identifying abnormal pathological changes in the input medical image, using an optical Fourier system, the method comprising:
    irradiating the input medical image of bodily tissue with light from an input beam;
    optically Fourier transforming light from the input medical image to generate a Fourier spectrum;
    applying at least one adjustable spatial filter to the Fourier spectrum to generate a filtered Fourier spectrum, the at least one adjustable spatial filter comprising a transparent annular ring surrounded by opaque regions;
    dynamically adjusting said adjustable spatial filter by expanding or contracting the transparent annular ring such that the adjustable spatial filter removes a first frequency component and transmits a second frequency component associated with the abnormal pathological changes in the input medical image;
    inversely Fourier transforming the filtered Fourier spectrum to generate a processed medical image including the transmitted second frequency component; and
    detecting the processed medical image.

16. The method of claim 15, wherein the input image comprises a two dimensional image generated by a medical imaging method.

17. The method of claim 16, wherein the input image is a mammogram.

18. The method of claim 16, wherein the input image is an image of a Pap smear.

19. The method of claim 16, wherein the input image is generated by at least one of an x-ray, magnetic resonance, computerized axial tomography and ultrasound imaging method.

20. The method of claim 15, wherein the input beam is generated by a light source comprising a laser.

21. The method of claim 20, wherein the laser comprises a diode pumped laser.

22. The method of claim 15, wherein the optical Fourier transformation and the inverse optical Fourier transformation are performed by lenses.

23. The method of claim 15, wherein the input beam is in a wavelength range of 300 to 800 nm.

24. The method of claim 15, wherein detecting the processed image comprises using a charge coupled device (CCD) for an image sensor.

25. The method of claim 15, further comprising generating an electronic representation from the image sensor using a controller that is electronically connected to the image sensor.

26. An optical system for real time processing of an input mammographic image, and dynamically identifying abnormal pathological changes in the input mammographic image, the system comprising:
    a light source emitting light directed at the input mammographic image;
    a first optical Fourier element that Fourier transforms light from the input mammographic image, wherein the Fourier transform occurs in a Fourier plane;
    an adjustable spatial filter in the Fourier plane that filters the transformed light to selectively remove a low frequency component and transmit a higher frequency component, the adjustable spatial filter comprising a transparent annular ring surrounded by opaque regions, wherein the transparent annular ring is expanded or contracted to transmit the higher frequency component which is dynamically selected to associate with the abnormal pathological changes present in the input mammographic image;

a second optical Fourier element that receives the filtered transformed light and inversely Fourier transforms the filtered transformed light to provide a processed mammographic image; and an image sensor that detects the processed image and generates an electronic representation of the processed image.

27. The optical system of claim 26, wherein the input image is generated by at least one of an x-ray, magnetic resonance, computerized axial tomography and ultrasound imaging method.

28. The optical system of claim 26, wherein the light source comprises a laser.

29. The optical system of claim 1, wherein the adjustable spatial filter comprises of a plurality of opaque circles of varying radii surrounded by transparent medium.

30. The optical system of claim 1, wherein the adjustable spatial filter comprises of an opaque ribbon with a varying width surrounded by transparent medium.

31. The method of claim 15, wherein the adjustable spatial filter comprises of a plurality of opaque circles of varying radii surrounded by transparent medium.

32. The method of claim 15, wherein the adjustable spatial filter comprises of an opaque ribbon with a varying width surrounded by transparent medium.

33. The optical system of claim 26, wherein the adjustable spatial filter comprises of a plurality of opaque circles of varying radii surrounded by transparent medium.

34. The optical system of claim 26, wherein the adjustable spatial filter comprises of an opaque ribbon with a varying width surrounded by transparent medium.

* * * * *